Feb. 19, 1963 H. D. POST 3,077,808
TAPE SPLICER
Filed Oct. 22, 1956 2 Sheets-Sheet 1

INVENTOR.
HERMAN D. POST
BY Michael S. Striker
Agt.

INVENTOR.
HERMAN D. POST
BY Michael S. Striker
Agt.

United States Patent Office 3,077,808

Patented Feb. 19, 1963

3,077,808
TAPE SPLICER

Herman D. Post, 214—26 41st Ave., Bayside, N.Y.

Filed Oct. 22, 1956, Ser. No. 617,492
1 Claim. (Cl. 83—581)

The present invention relates to splicers of the type used for splicing together elongated flexible elements such as portions of a tape which have become broken.

During the operation of devices such as tape recorders where tape on one reel unwinds and moves onto another reel, it sometimes happens that the tape breaks, and it then becomes necessary to splice together the portions of the tape at the break thereof. It is conventional to splice together such tape portions with a scissors and with a piece of adhesive tape, the scissors being used to cut the ends of the tape at the break thereof and for trimming the tape after the adhesive is applied thereto so that the adhesive material cannot contact any elements of the recording device or the like so as to undesirably disturb the operation thereof. This conventional manner of splicing a tape is not only time consuming and extremely inconvenient, but in addition if the person making the splice does not have very good manual dexterity, the splice is very poorly made and often will not hold the tape portions together reliably.

One of the objects of the present invention is to provide a tape splicer which can be used by anybody regardless of their manual dexterity with ease and convenience in order to provide a splice of high quality and of a professional appearance.

Another object of the present invention is to provide a tape splicer which is of an extremely simple construction and which is also of an extremely low cost.

A further object of the present invention is to provide a tape splicer which has a very small number of individual elements and which has no moving parts to disturb the operation thereof.

An additional object of the present invention is to provide a tape splicing structure which is safe to use in that the likelihood of any sharp edges cutting the user is very small.

With the above objects in view the present invention mainly consists of a tape splicer which includes an anvil member having a means for maintaining a pair of tape portions which are to be spliced in a position where these tape portions overlap each other. A cutter member is provided with a miter cutting blade and a trimming blade adapted to be successively applied to the overlapping tape portions for first providing a miter joint between the ends of the tape portions and then trimming the joint after an adhesive member is applied thereto. A guide means is carried by the anvil member and by the cutter member for guiding the latter during its miter cutting and trimming operations.

The novel features which are considered as characteristic for the invention are set forth in particular in the appended claim. The invention itself, however, both as to its construction and its method of operation, together with additional objects and advantages thereof, will be best understood from the following description of specific embodiments when read in connection with the accompanying drawings, in which:

Figure 5:
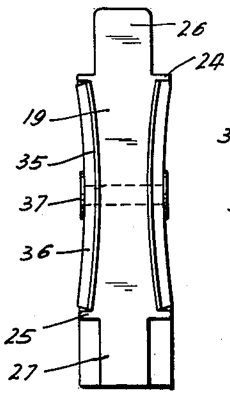
FIG. 5 is an elevational view of the cutter member of FIG. 1 as seen from the left side of FIG. 1.

Referring now to the drawings and to FIGS. 1–5 in particular, the splicer of the invention includes a cutter member 15 which is composed of a rigid member 16 made of any suitable material such as wood, plastic or the like. The rigid member 16 is formed with an opening 17 so as to facilitate gripping of the member 16 by the operator between the thumb and first finger, for example. The rigid member 16 is provided with an elongated edge face 18 located at the bottom of the member 16, as viewed in FIG. 1, and the member 16 is also provided with an elongated edge face 19 located at the left of the member 16, as viewed in FIG. 1. The opposite side faces of the member 16 are provided adjacent the ends of the edge face 18 with a pair of shoulders 20 and 21 at each side face, so that in this way the elongated edge face 18 has a pair of end portions 22 and 23 which are narrower than the portions of the edge face 18 immediately adjacent its end portions 22 and 23, as shown most clearly in FIG. 2. The shoulders 20 are also visible in FIG. 3 which illustrates how narrow or thin the member 16 is.

Each of the side faces of the member 16 is also provided with a pair of shoulders 24 and 25 adjacent the ends of the elongated edge face 19 so as to provide the latter with a pair of elongated narrow end portions 26 and 27 as shown in FIG. 5. It will be noted that the shoulders 21 and 25 are part of a single cutout located at the lower left corner of the rigid member 16, as viewed in FIG. 1.

Figure 1:
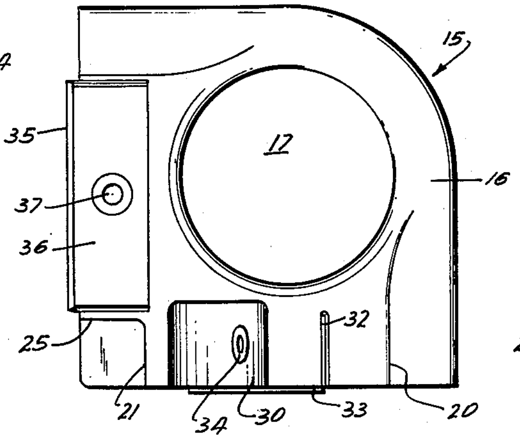
FIG. 1 is a side elevational view of a cutter member of a splicer according to the present invention.

The rigid member 16 is formed adjacent the edge face 18 thereof with a pair of cutouts 30 and 31 which extend upwardly from the edge face 18, as viewed in FIG. 1, and between these cutouts 30 and 31 the member 16 is provided with a slit 32 located in a plane extending diagonally across the edge face 18. A miter cutting blade 33 is located in the slit 32, and a rivet 34 extends between the cutouts 30 and 31 and through a portion of the rigid member 16 in order to fix the miter cutting blade 33 in position. As is evident from FIG. 1, the lower cutting edge of the miter cutting blade 33 extends slightly beyond the edge face 18.

Figure 3:
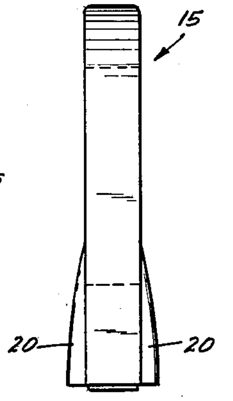
FIG. 3 is an elevational view of the cutter member of FIG. 1 as seen from the right side thereof.
Figure 2:
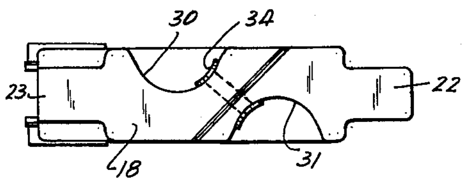
FIG. 2 is a bottom plan view of the cutter member of FIG. 1.
Figure 4:
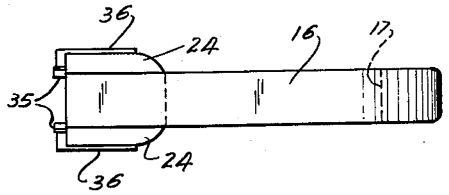
FIG. 4 is a top plan view of the cutter member of FIG. 1.

The shoulders 24 located at the edge face 19 are also visible in FIG. 4, and from FIGS. 3 and 4 it is seen that the member 15 is relatively thin. The edges of the member 16 which extend between the edge faces 18 and 19 thereof are preferably rounded.

Between the shoulders 24 and 25, each of the side faces of the rigid member 16 is formed with an arcuate recess which receives a trimming cutting blade 35, the outwardly directed faces of these blades being concave, as is evident particularly from FIG. 5. A pair of protective plastic members 36 are located against the outer faces of the blades 35, and the cutting edge of each blade 35 extends slightly beyond the protective member 36 located against the same, as is shown in FIG. 1. A rivet 37 or the like extends through the member 16 and through the blade 35 and the protective members 36 so as to hold the elements 35 and 36 in position in the recesses of the member 16.

Figure 6:
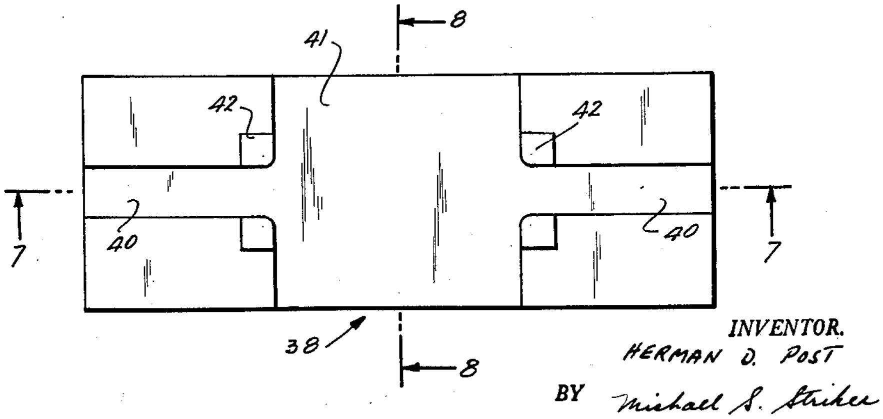
FIG. 6 is a plan view of an anvil member of the splicer of the present invention.
Figure 7:
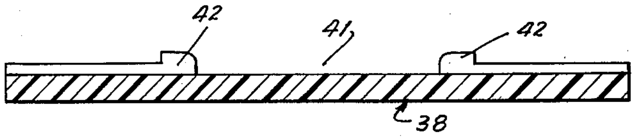
FIG. 7 is a sectional elevational view taken along line 7—7 of FIG. 6 in the direction of the arrows.
Figure 8:
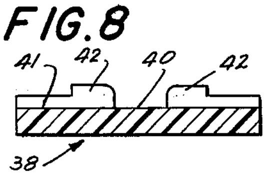
FIG. 8 is a sectional elevational view taken along line 8—8 of FIG. 6 in the direction of the arrows.

The splicer of the invention also includes an anvil member which illustrated in FIGS. 6–8. This anvil member is made of a rigid material which may be the same as the material which forms the cutter member 15. The anvil member 38 is elongated and relatively thin and is formed in its top face with an elongated groove 40 extending along the entire length of the anvil member between its opposite side edges. The groove 40 has an intermediate portion 41 which is wider than the portions of groove 40 immediately adjacent intermediate portion 41, and in the illustrated example the intermediate portion 41 of the groove 40 extends to the opposite side edges of the anvil member 38. At the junctions between the intermediate portion 41 of the groove 40 and the immediately adjacent portions of the groove 40, the anvil member is provided with upwardly extending projections 42.

The distance between the shoulders 20 and 21 is substantially equal to the distance between the left projections 42 of FIG. 6 and the right projection 42 of FIG. 6, and the distance between the shoulders 24 and 25 is also substantially equal to the distance between the left projections 42 of FIG. 6 and the right projections 42 of FIG. 6. Furthermore, the width of the elongated end portions 22 and 23 of the edge face 18 is substantially equal to the width of the groove 40 at the portions thereof immediately adjacent the intermediate portion 41 of this groove, and the width of the end portions 26 and 27 of the edge face 19 is substantially equal to the width of the groove 40 at the portions thereof immediately adjacent intermediate portion of the groove 40.

Figure 9:
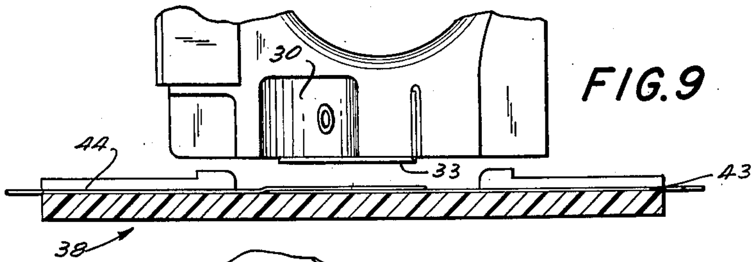
FIG. 9 is a fragmentary elevational view illustrating the operation of a miter cutting blade of the cutter of FIG. 1.
Figure 10:
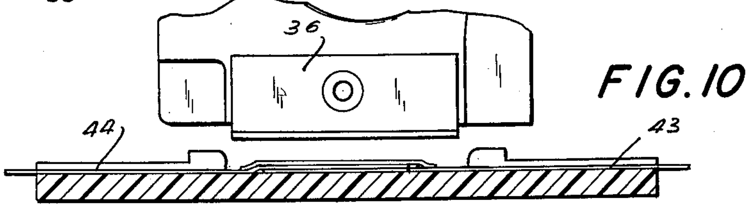
FIG. 10 is a fragmentary elevational view illustrating the operation of the trimming blades of the cutter of FIG. 1.
Figure 11:
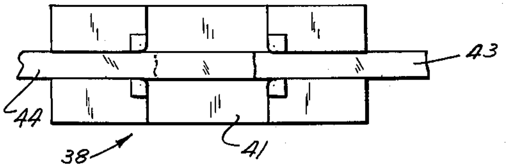
FIG. 11 is a plan view illustrating the relationship of a pair of tape portions when they are placed on the anvil preparatory to being spliced together.
Figure 12:
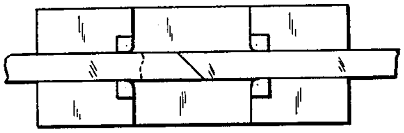
FIG. 12 illustrates the tape portions of FIG. 11 on the anvil after the miter cutting blade has been applied thereto in the manner shown in FIG. 9.

The operation of the above described structure is illustrated in FIGS. 9 and 10. When it is desired to splice together a pair of tape portions 43 and 44 shown in FIG. 9, these tape portions are placed in the groove 40 with their free ends overlapping each other in the intermediate portion 41 of the groove 40. With the tape portions in this position, this position being further illustrated in FIG. 11 which shows the tape portions 43 and 44 in overlapping relationship in plan view within the groove 40 of the anvil member 38, the cutter member 15 is moved downwardly to the tape portions with the elongated edge face 18 of the cutter member 15 directed downwardly so that the miter cutter 33 is directed toward the tape portions. As the cutter 15 is moved downwardly, the elongated free end portions 22 and 23 become located in the portions of the groove 40 immediately adjacent the intermediate portion 41 thereof, and the shoulders 20 and 21 slide along and are guided by the projections 42, so that in this way the anvil member not only supports the tape portions 43 and 44, but in addition the anvil member guides the cutter member 15 during its downward movement. The cutter member 15 is pressed downwardly by the operator so that the miter cutter 33 cuts the two tape portions 43 and 44, and then the severed end portion of the upper tape portion 44 is blown away after the cutter member 15 is removed from the anvil member 38, so that the tape portions 43 and 44 then have the configuration illustrated in FIG. 12 from which it will be evident that at the miter cut the tape portions 43 and 44 abut each other and the severed free end of the tape portion 43 is still beneath the tape portion 44. After the cutter 15 has been removed the operator places a piece of adhesive tape or the like over the butt joint of the tape portions 43 and 44 at the place where the miter cut has been provided.

Figure 13:
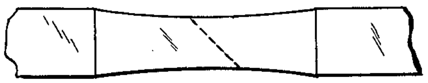
FIG. 13 is an illustration of the splice which is provided with the structure of the invention.

Then the cutter 15 is turned through 90° from the position thereof shown in FIG. 1 in a counterclockwise direction, so that the elongated edge face portion 19 is directed downwardly, and thus the trimming cutters 35 are directed downwardly, and with the cutter 15 held in this position the operator moves the cutter 15 downwardly, as indicated in FIG. 10, the elongated end portions 26 and 27 of the elongated edge face 19 entering into those portions of the groove 40 which are immediately adjacent its intermediate portion 41, and the shoulders 24 and 25 being located just inside of and sliding along the projections 42, so that the anvil member also guides the cutter member 15 during the trimming operations. The cutter 15 is now pressed downwardly so that the arcuate cutting blades 35 trim away the outer edge portion of the adhesive tape as well as of the tape portions 43 and 44, and the final configuration of the splice tape is shown in FIG. 13. After the cutter 15 is removed from the anvil 38, the spliced tape is removed from the anvil, and the severed end of the tape portion 43 can then be blown away.

It will be noted, from FIG. 13 that a precisely spliced tape of professional appearance and quality is provided with the structure of the invention. The cutting edges extend only to a slight extent to the exterior of the member 15 so that there is little danger to the operator. Furthermore, the structure is extremely rugged and simple and contains no moving parts so that it is extremely inexpensive and very reliable in operation.

As is evident from the above description, the tape splicer of the invention consists only of two operating parts small enough to be held and operated by hand and cooperating together only when manipulated by the operator. One of these operating parts is the cutter-carrying member 15 which consists in its entirety of the solid unitary body of substantially rigid material 16 and the pair of cutter means 33 and 35 which are fixedly carried by the cutter-carrying member 15 at the pair of different outer surfaces at the periphery thereof, these surfaces being at right angles to each other, as is apparent from FIG. 1. The cutter means 33 is the miter cutter and the cutter means 35 is the trimming cutter. The other of the operating parts of the tape splicer of the invention is the anvil member which also consists in its entirety of a solid unitary body of substantially rigid material, this anvil member 38 including means in the form of the groove 40 for maintaining a pair of tape portions which are to be spliced in a position where the tape portions overlap each other to be cut first by the miter cutter and then by the trimming cutter, and the anvil member 38 also including a means formed by the projections 42 for guiding the cutter-carrying member 15 during splicing operations. It will further be noted that the anvil member 38 is in the form of a relatively thin substantially flat plate and the projections 42 are quite short so that they serve to guide the cutter-carrying member 15 only when the latter is in the immediate vicinity of the tape to be spliced, and also it will be seen that the cutter-carrying member 15 is in the form of a relatively thin substantially flat member of substantially rectangular configuration having a pair of adjoining peripheral edge portions which intersect each other at a substantial right angle respectively carrying the pair of cutter means.

It will be understood that each of the elements described above, or two or more together, may also find a useful application in other types of splicers differing from the types described above.

While the invention has been illustrated and described as embodied in tape splicers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

A tape splicer comprising, in combination, a substantially rigid member small and light enough to be held and operated by hand and having a pair of side faces which define between themselves a pair of elongated edge face portions which make substantially right angles with each other, each of said side faces being formed at end portions of each of said edge face portions with a pair of shoulders directed away from each other, so that each of said elongated edge face portions has a pair of end portions which are narrower than the portions of each edge face portion immediately adjacent said end portions thereof, and the distance between the shoulders of each side face at one of said edge face portions being equal to the distance between the shoulders of each side face at the other of said edge face portions of said rigid member; a miter cutting blade carried by said substantially rigid member between said end portions of one of said elongated edge face portions and projecting from said latter edge face portion; a trimming cutter carried by said rigid member between the end portions of the other of said elongated edge face portions and projecting from the latter; and an anvil member having a top face formed with an elongated groove having an intermediate portion wider than the portions of said groove immediately adjacent said intermediate portion, said groove having a length greater than that of each of said elongated edge face portions of said rigid member and the width of said groove portions immediately adjacent said intermediate portion thereof being equal to the width of said end portions of said pair of edge face portions of said substantially rigid member, said intermediate portion of said groove having a length equal to the distance between the pair of shoulders of each of said side faces at each of said elongated edge face portions of said rigid member, so that the latter is guided by said anvil member when said miter cutter and trimming cutter are successively used to splice and trim a tape.

References Cited in the file of this patent

UNITED STATES PATENTS

| | | |
|---|---|---|
| 27,123 | Greeley | Feb. 14, 1860 |
| 162,071 | Hungerford | Apr. 13, 1875 |
| 379,857 | Cave et al. | Mar. 20, 1888 |
| 989,059 | Ryberg | Apr. 11, 1911 |
| 1,182,493 | Le Duc | May 9, 1916 |
| 1,625,403 | Stevens | Apr. 19, 1927 |
| 1,880,935 | Elliot et al. | Oct. 4, 1932 |
| 2,151,119 | Kini | Mar. 21, 1939 |
| 2,778,420 | Simon | Jan. 22, 1957 |